April 18, 1950 R. S. DAWSON 2,504,184
COMBINATION DRIER AND ACCUMULATOR
Filed Aug. 13, 1947
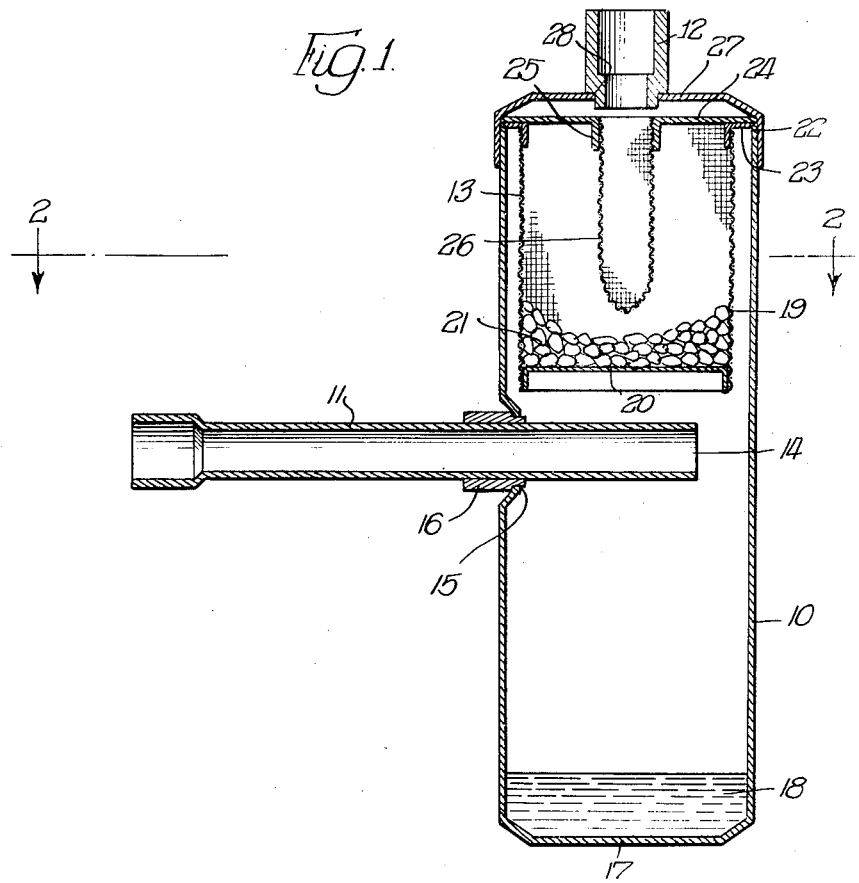
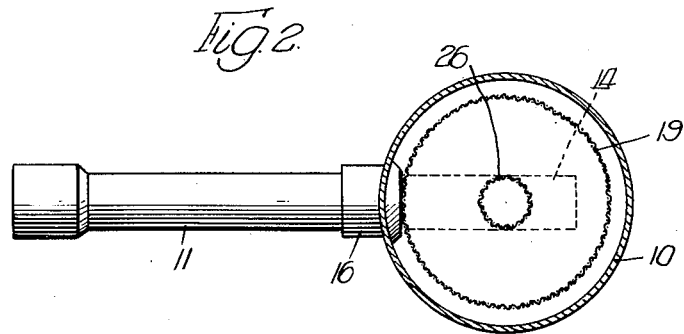
INVENTOR.
Richard S. Dawson,
By Cromwell, Greist & Warden
Attys Patented Apr. 18, 1950

2,504,184

UNITED STATES PATENT OFFICE 2,504,184

COMBINATION DRIER AND ACCUMULATOR

Richard S. Dawson, Evanston, Ill., assignor to Henry Valve Company, Incorporated, Chicago, Ill., a corporation of Illinois Application August 13, 1947, Serial No. 768,364

3 Claims. (Cl. 183—4.4)

This invention relates to a combination drier, strainer and accumulator for use in refrigeration or air conditioning systems in which a gaseous fluid is circulated as a heat exchange medium.

An object of the invention is to provide a combination device which may be installed as a single unit in a refrigeration system for straining and drying the gaseous refrigerant and also for accumulating any liquid which may develop in the system.

Another object of the invention is to provide a combination accumulator, strainer and drier for a refrigerating system wherein the inlet means is arranged to facilitate the separating of any globules of liquid accumulating in the refrigerant and wherein a drying and straining means is interposed between the inlet means and the outlet means of the same.

Another object of the invention is to provide in a refrigerating system a device which comprises an accumulator vessel having an inlet tube projecting a substantial distance into the vessel so that its inner end is in spaced opposed relation to a wall of the vessel to cause the incoming refrigerant to impinge on the wall and thereby tend to separate from the gas any globules of liquid present in the refrigerant.

These and other objects of the invention will be apparent from a description of the preferred form thereof which is shown by way of illustration in the accompanying drawings, wherein:

Fig. 1 is a sectional elevation of a combination accumulator, strainer and drier unit embodying the principles of the invention; and Fig. 2 is a sectional view on the line 2—2 of Fig. 1.

Referring to the drawings, the preferred form of the device is illustrated in a vertical, upright position in which it would be connected in a refrigeration system.

The device comprises a tubular vessel or accumulator cylinder 10 of substantial depth. An elongated horizontal tube 11 forms one connection in the refrigerant system and constitutes the inlet for the device. A vertical outlet connection 12 is provided in the top of the vessel 10 and a drier 13 is positioned between the inner end 14 of the inlet 11 and the outlet 12.

The inlet tube 11 is preferably located intermediate the top and bottom of the vessel 10 being supported in an aperture 15 in one wall or side of the vessel 10 by a collar 16 and extending a substantial distance into the vessel 10 so that the inner end 14 is in opposed relation adjacent the opposite wall or side of the container. The gaseous refrigerant enters the vessel 10 through the inlet tube 11 and impinges on the wall of the container opposite the end 14 of the tube 11.

The globules which are separated from the fluid upon impingement on the wall of the accumulator vessel will fall by gravity into the bottom 17 of the vessel 10 and form an accumulation 18 which is vaporized as it is required in the system.

The dried 13 comprises a tubular screen member 19 and a bottom member 20 and extends downwardly into the accumulator vessel 10. The vessel formed by members 19 and 20 is adapted to be filled with a suitable drying agent 21. The screen 19 is supported on the top rim 22 of the accumulator vessel 10 by a flange ring 23 and is closed by a plate 24. The center of the plate 24 is provided with an aperture forming flange 25 which supports a perforated dispersion tube 26. The tube 26 is hollow and extends a substantial distance within the tubular screen member 19.

The outlet connection 12 is supported in the accumulator vessel 10 by a top or cap member 27 having a central aperture 28 in which the outlet tube 12 is secured. The outlet tube 12 and the dispersion tube 26 are arranged in vertical alignment.

The gaseous refrigerant passes from the end 14 of the inlet tube 11 and circulates around and through the cylindrical screen 19 of the drier 13, passing through the dispersion tube 26 to the outlet connection 12 and thence back into the refrigeration system.

The passage of the refrigerant through the accumulator provides for separation of globules of liquid in the refrigerant followed by a drying and screening action which removes any moisture from the refrigerant and returns it to the system in proper condition for recirculation. Liquid globules which are separated from the fluid as they emerge from the tube 11 fall to the bottom 17 of the accumulator vessel 10 and form the liquid accumulation 18 which is available for vaporization as it is required in the system.

The combined device of the invention is adapted to be connected as a unit in the refrigeration system and substantially reduces the number of connections which have heretofore been required to provide the system with separate devices for accumulating, straining and drying the refrigerant.

While specific details of construction and materials have been referred to in describing the illustrated form of the invention, it will be understood that other details of construction and other materials may be resorted to within the spirit of the invention.

I claim:

1. In combination, an accumulator receptacle having an inlet and an outlet, the inlet comprising a tube having its end extending a substantial distance into said receptacle intermediate the ends of the receptacle, a drying device projecting into said receptacle between said inlet tube and the outlet of said receptacle with its side walls in spaced relation to the surrounding receptacle walls, the inner end of said inlet tube being positioned in opposed relation adjacent a wall of said receptacle, and a dispersion tube projecting into said drying device, said tube being in communication with the outlet for said receptacle.

2. A device for insertion in a fluid line, comprising an imperforate outer tubular casing having an outlet opening in its upper end, an inlet tube projecting horizontally through a side wall of said outer casing with its inner end positioned in proximity to the opposite side wall thereof, a perforated inner tubular casing extending into said outer casing at the outlet end of the latter, said inner casing being smaller than said outer casing, a replaceable dehydrating agent in said inner casing and a hollow perforated dispersion tube extending a substantial distance into said inner casing, said dispersion tube being in communication with the outlet opening in the outer casing.

3. A combination drier and accumulator device for insertion in a fluid line, comprising a vertical cylindrical casing, an elongate horizontal inlet tube extending a substantial distance into the casing intermediate the top and bottom ends of the casing so that a gaseous fluid may enter the casing and impinge upon the wall of the casing opposite the end of the inlet tube to separate globules of liquid in the fluid, a perforated cylindrical receptacle projecting downwardly in the top of the casing in spaced relation to the side walls thereof, a replaceable drying agent in the receptacle, and a perforated dispersion tube extending downwardly a substantial distance into the receptacle, said casing having an outlet opening in the top thereof in communication with said dispersion tube.

RICHARD S. DAWSON.

REFERENCES CITED

The following references are of record in the file of this patent:

UNITED STATES PATENTS

| Number | Name | Date |
|---|---|---|
| 1,772,089 | Smith | Aug. 5, 1930 |
| 2,273,779 | Dickey | Feb. 17, 1942 |
| 2,325,657 | Barkness | Aug. 3, 1943 |